UNITED STATES PATENT OFFICE.

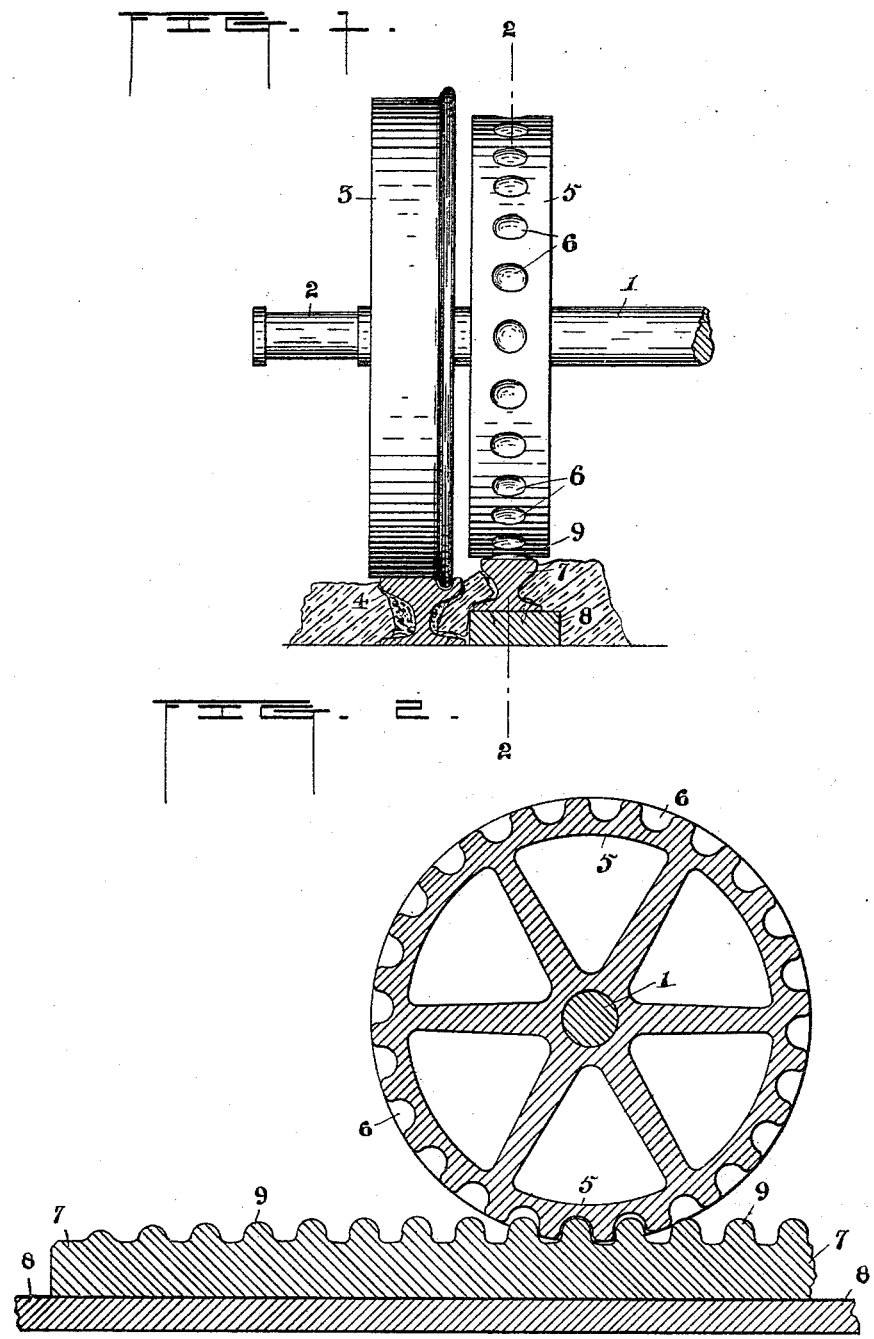

WILLIAM EDGAR PRALL, OF WASHINGTON, DISTRICT OF COLUMBIA.

TRACTION DEVICE.

SPECIFICATION forming part of Letters Patent No. 457,794, dated August 18, 1891.

Application filed June 1, 1891. Serial No. 394,756. (No model.)

*To all whom it may concern:*

Be it known that I, WILLIAM EDGAR PRALL, a resident of Washington, in the District of Columbia, have invented certain new and useful Improvements in Traction Devices; and I do hereby declare the following to be a full, clear, and exact description of the invention, such as will enable others skilled in the art to which it pertains to make and use the same.

The invention relates to means for preventing the slipping of the wheels of a car on the rails in a steep grade; and it consists in the construction hereinafter described and particularly pointed out.

In the accompanying drawings, Figure 1 is a partial elevation of a car axle and wheels, a track-rail and adjacent rack being shown in transverse section; and Fig. 2 is a section on line 2 2 of Fig. 1.

Numeral 1 denotes an axle provided with a journal 2, adapted to fit a bearing of any usual character.

3 denotes a car-wheel made fast on the axle by means of keys or otherwise.

4 represents a rail of usual form.

5 is a wheel secured to the axle near the wheel 3. It is preferably make with a tread or rim four and a half or five inches wide, which is provided at equidistant points with holes 6, about one and one-half inches in diameter.

7 denotes a rack suitably arranged by the side of the rail. It can be supported upon a sill 8 or in any convenient and suitable manner. This rack is provided with teeth 9, which are approximately semi-ovoid in form and have a diameter slightly smaller than that of the holes in the rim 5. This wheel has a diameter less than that of wheel 3.

The rack 7 is to be used on steep grades, and, preferably, on both sides of the track, so as to engage two or more wheels 5, placed on the inside of opposite wheels 3. It is not essential that the wheels 5 be made entirely separate from wheels 3. They are, however, made of less diameter, so that they will not come in contact with the pavement or road-bed under ordinary conditions.

The teeth 9 at each end of the rack are made short and small and gradually increase in size toward the main or middle portion of said rack, the purpose being to provide for their easy and gradual engagement with the holes in the wheel. The teeth are made circular in cross-section, and the holes are made round to provide for a lateral turning of the wheel and of its tread upon the teeth when the track is curved.

It is important that the holes be in the wheel and the teeth on the rack upon the ground, for the reason that the teeth if placed on the wheel are liable to be broken by accidental contact with stones or other hard objects, and especially in case the car runs off the track. In such case the weight of the car would increase the destructive effect of stones and the like upon the teeth, and, further, if the holes were formed in the stationary rack, they would be liable to be obstructed by dirt and pebbles. It is therefore characteristic of my improvement that round teeth are used, and that they are fixed upon a stationary rack and made to engage with similarly-shaped holes in the rim of a wheel fixed on the car-axle.

Having thus described my invention, what I desire to secure by Letters Patent is—

1. In combination with the rack secured near the rail and provided with teeth which are approximately semi-ovoid in form, a wheel made fast on a car-axle and provided with circular holes adapted to receive the teeth of the rack, substantially as set forth.

2. In combination with the rack secured near the rail and provided with teeth which are approximately semi-ovoid in form, a wheel made fast on the car-axle and provided with circular holes adapted to receive the teeth of the rack, said teeth being gradually diminished in size at each end of said rack, substantially as set forth.

In testimony whereof I have signed this specification in the presence of two subscribing witnesses.

WILLIAM EDGAR PRALL.

Witnesses:
ARCH. M. CATLIN,
THOS. S. HOPKINS.